United States Patent Office 3,518,283
Patented June 30, 1970

3,518,283
PIVALOYL AND UNDECANOYL ESTERS
OF GRISEOFULVOL
Arnold Brossi, Verona, N.J., and Max Gerecke, Basel,
and Emilio Kyburz, Reinach, Switzerland, assignors to
Hoffmann-La Roche Inc., Nutley, N.J., a corporation
of New Jersey
No Drawing. Continuation of application Ser. No.
86,850, Feb. 3, 1961. This application Dec. 26,
1968, Ser. No. 787,263
Claims priority, application Switzerland, Feb. 12, 1960,
1,551/60
Int. Cl. C07d 5/32
U.S. Cl. 260—346.2        2 Claims

ABSTRACT OF THE DISCLOSURE

Compounds of the formula

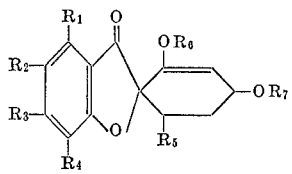

wherein $R_1$, $R_2$, $R_3$ and $R_4$ can be the same or different and represent hydrogen, lower alkyl, lower haloalkyl, lower alkoxy, hydroxy, or halogen; $R_5$ represents hydrogen or a lower alkyl group; $R_6$ represents a lower alkyl group; $R_7$ represents hydrogen, alkanoyl, oxalyl, alkenoyl, aroyl, aralkanoyl, aryloxyalkanoyl, alkyl, alkoxy-alkyl, or aryl.

The spirocyclic keto compounds of the above formula are useful as antifungal agents, e.g., against *Trichophyton mentagrophytes* and *Botrytis allii*.

RELATED APPLICATIONS

This case is a continuation of Ser. No. 86,850, filed Feb. 3, 1961 now abandoned, in the name of Arnold Brossi. Max Gerecke and Emilio Kyburz.

DESCRIPTION OF THE INVENTION

This invention relates to spirocyclic keto-compounds and to processes for the manufacture thereof. The spirocyclic keto-compounds of the invention are represented by the formula:

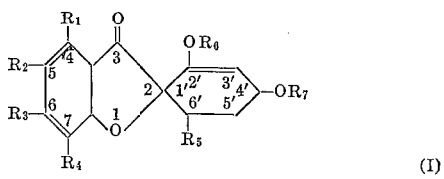

wherein $R_1$, $R_2$, $R_3$ and $R_4$ can be the same or different and represent hydrogen, lower alkyl, lower haloalkyl, lower alkoxy, hydroxy or halogen; $R_5$ represents hydrogen or a lower alkyl group; $R_6$ represents a lower alkyl group; and $R_7$ represents hydrogen, alkanoyl, oxalyl, alkenoyl, aroyl, aralkanoyl, aryloxyalkanoyl, alkyl, alkoxy-alkyl, or aryl.

The processes according to the invention comprise reducing a spirocyclic diketone of the formula:

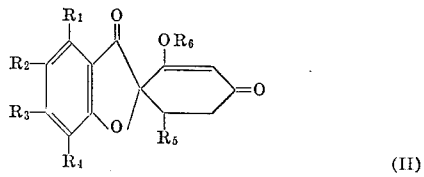

wherein $R_1$ to $R_6$ have the same meaning as above, with a hydride of the formula $M_1M_3H_4$, wherein $M_1$ is an alkali metal, and $M_3$ is boron or aluminum, and, if desired, converting the so obtained spirocyclic keto-alcohol into an ester or ether.

In the above formula, the alkyl groups and alkyl portions of the haloalkyl and alkoxy groups are lower alkyl groups such as methyl, ethyl, propyl, isopropyl, butyl or isobutyl, or straight or branched chain hexyl. Haloalkyl includes mono- and polyhalogenated alkyl groups such as trifluoromethyl, chloromethyl, 1,2-dibromoethyl, etc. The alkoxy radicals are lower alkoxy such as methoxy, ethoxy, propoxy and butoxy. The halogen, alone or as part of a haloalkyl group, can be fluorine chlorine, bromine or iodine.

Keto esters of the invention are represented by compounds of the Formula I, wherein $R_7$ is alkanoyl, alkenoyl, aroyl, aralkanoyl, aryloxy-alkanoyl, or oxalyl. Examples of these groups are as follows: alkanoyl radicals, preferably lower alkanoyl, e.g., acetyl, propionyl, butyryl, pivaloyl; alkenoyl radicals, e.g., acrylyl, crotonyl or undecenoyl, preferably lower alkenoyl; aroyl radicals, e.g., benzoyl or substituted benzoyl such as p-hydroxy-benzoyl and p-nitro-benzoyl; aralkanoyl radicals, e.g., phenyl acetyl; aryloxy-alkanoyl radicals, e.g., phenoxy-acetyl. The keto esters are prepared by treating the spirocyclic keto-alcohol of Formula I wherein $R_7$ is hydrogen according to known methods with appropriate acylating agents, such as lower alkanoic acids, their anhydrides or halogenides, e.g., lower alkanoyl halides to form the corresponding keto esters. Preferred acylating agents are acetic anhydride in pyridine or the acyl halide of pivalic acid in pyridine.

Keto ethers of the invention are represented by compounds of the Formula I, wherein $R_7$ is alkyl, preferably lower alkyl, alkoxy-alkyl, preferably lower alkoxy-lower alkyl, or aryl, such as phenyl or substituted phenyl. The keto ethers can be prepared by reacting the keto esters with alcohols. Alternatively, the keto alcohol can be reacted with an alkyl halogenide, such as methyl iodide, in the presence of an acid binder, e.g., sodium methylate.

The spirocyclic diketones of Formula II required as starting materials are partly new compounds. The dextrorotatory compound, wherein $R_1$ and $R_3$ represent methoxy, $R_2$ represents hydrogen, $R_4$ represents chlorine and $R_5$ and $R_6$ each stand for methyl, corresponds to the natural antibiotic griseofulvin. Other compounds corresponding to Formula II may be prepared by reacting a 2-carbalkoxy-coumaran-3-one of the formula

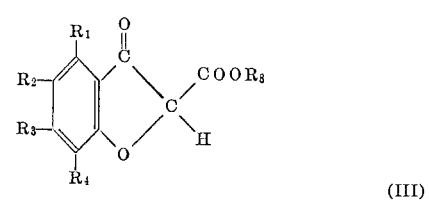

wherein $R_1$ to $R_4$ have the same meaning as in Formula I and $R_8$ stands for lower alkyl, with a methyl vinyl ketone that can have an alkyl group in the β-position, cyclizing the resulting addition product and converting the resulting spirocyclic triketone into its enolether. If the addition reaction is carried out with a β-alkylated methyl vinyl ketone, then the starting material exhibits two asymmetric centers and therefore two stereoisomeric racemates may be expected. These racemates may be separated before carrying out the process of the invention, e.g., by fractional crystallization or chromatography on aluminum oxide. The alkylation of the spirocyclic triketone to the corresponding enolether usually results in the formation of a mixture of two position isomers due to the presence of the β-diketo grouping. The mixture these two isomers, wherein the ether group is either in 2- or 4-position, may b separated before carrying out the process of the invention, e.g., by fractional crystallization or chromatography on aluminum oxide.

The 2-carbalkoxy-coumaran-3-ones of the Formula III are also partly new compounds which may be produced according to known procedures, e.g., by first esterifying salicyclic acid or an aromatic ring substituted salicyclic acid, then treating the ester in the presence of an alkaline condensation agent with a haloacetic acid ester and finally cyclizing the resulting diester by the method of Dieckmann.

The process of the invention is carried out by using as the reducing agent a hydride of the formula $M_1M_3H_4$ wherein $M_1$ is an alkali metal and $M_3$ is boron or aluminum, such as lithium aluminum hydride, lithium borohydride, sodium borohydride or potassium borohydride, preferably in an appropriate solvent, e.g., an alkanol such as methanol or ethanol, or a cyclic ether such as tetrahydrofurane or dioxane, or in one of the aforementioned solvents with an appropriate admixture of water. A preferred mode of operation consists in reducing with the aid of sodium borohydride in methanol at room temperature.

The reduction of the keto group to the hydroxy group gives rise to a new asymmetric center. Therefore, new stereoisomers may be expected. The present invention includes all possible stereoisomers.

The spirocyclic keto compounds of the invention are useful as antifungal agents, e.g., against *Trichophyton mentagrophytes* and *Botrytis allii*.

Due to their low toxicity they are well tolerated. Therefore, they are intended to be used as medicaments and as intermediates in the preparation of medicaments.

The invention will be better understood by referring to the following examples which are given for illustration purposes only and are not meant to limit the invention.

EXAMPLE 1

15 g. of griseofulvin were suspended in 1.2 liters of absolute methanol and reduced by adding with stirring 3 g. of sodium borohydride, and continuing the stirring for one hour at room temperature. At the end of this time a clear solution was present. After stirring an additional hour, 700 ml. of ice water were added, and the solution adjusted to a pH value of 6 by adding 2 N hydrochloric acid. The solution was then concentrated in vacuo at a temperature of 50° to a volume of 1 liter and 1 liter of ice water added to the resulting concentrate. A crystalline product separated to and was recrystallized from 150 ml. of methanol. There were obtained 14.5 g. of (+)-7-chloro-4,6,2′-trimethoxy-6′-methyl-gris-2′-en-4′-ol-3-one of M.P. 167° (previous softening); $[\alpha]_D = +164°$ (acetone; c.=0.85).

EXAMPLE 2

355 mg. of griseofulvin were dissolved in 20 ml. of absolute tetrahydrofuran. The solution was slowly added to a suspension of 44 mg. of lithium aluminum hydride in 12 ml. of absolute tetrahydrofuran. The reaction mixture was kept boiling under reflux during 2½ hours. After working up according to the procedure of Example 1, there were obtained 360 mg. of a crude reduction product, which after recrystallization from methanol was identical with the reduction product of Example 1.

EXAMPLE 3

15 g. of (+)-7-chloro - 4,6,2′ - trimethoxy-6′-methyl-gris-2′-en-4′-ol-3-one (of Example 1) were dissolved in 200 ml. of pyridine. To this solution 200 ml. of acetic anhydride were added. The mixture was kept at room temperature over 15 hours. Afterwards it was poured into 4 liters of ice water and further stirred for 1 hour. The crystalline precipitate which separated was filtered, washed with water and dried. There were obtained 15.5 g. of (+)-4′-acetoxy-7-chloro-4,6,2′-trimethoxy-6′-methyl-gris-2′-en-3-one of M.P. 205–206°; $[\alpha]_D = +117$ (acetone; c.=1.0).

EXAMPLE 4

According to the procedure of Example 3 and by using propionic acid anhydride and pyridine, there was obtained (+) - 7-chloro-4,6,2′-trimethoxy-δ′-methyl-4′-propionyl-oxy-gris-2′-en-3-one of M.P. 185–186°; $[\alpha]_D = +94°$ (acetone; c.=1.02).

EXAMPLE 5

3 g. of (+)-7chloro-4,6,2′-trimethoxy-6′-methyl-gris-2′-en-4′-ol-3-one (obtained from Example 1) were dissolved in 60 ml. of pyridine. To this solution, 11 ml. of benzoyl chloride were slowly added at a temperature of 0°. After standing over 20 hours at room temperature the mixture was poured into ice water and extracted with benzene. The benzene solution was first washed with 1 N hydrochloric acid, then with saturated sodium carbonate solution and finally with water. The residue obtained after evaporating the benzene was recrystallized from methanol and yielded 2 g. of (+)-4′-benzoyloxy-7-chloro-4,6,2′-trimethoxy-6′-methyl-gris-2′-en-3-one, which after three further recrystallizations from methanol melted at 190–191°; $[\alpha]_D = +95°$ (acetone; c.=1.0).

According to the same procedure, but by using pivaloyl chloride and phenoxy acetyl, the following two compounds were obtained: (+)-7-chloro-4,6,2′-trimethoxy-6′-methyl - 4′ - pivaloyloxy-gris-2′-en-3-one; M.P. 192°; $[\alpha]_D = +81°$ (acetone; c.=1.0); (+)-7-chloro-4,6,2′-trimethoxy-6′-methyl-4′-phenoxyacetoxy-gris - 2′ - en-3-one; M.P. 156–157°; $[\alpha]_D = +89°$ (acetone; c.=0.8).

EXAMPLE 6

355 mg. of (+)-7-chloro-4,6,2′-trimethoxy-6′-methyl-gris-2′-en-4′-ol-3-one (from Example 1) and 138 mg. of p-hydroxy benzoic acid were dissolved in 2 ml. of dimethyl formamide. To this solution 226 mg. of dicyclohexyl carbodiimide in 1 ml. of dimethyl formamide is added. After standing over 15 hours dicyclohexyl urea was filtered off, the filtrate was concentrated and taken up in ether. The ethereal solution was first washed with aqueous sodium bicarbonate solution and then treated with ice-cold diluted sodium hydroxide solution in order to extract the reaction product. Subsequently the sodium hydroxide extract was again acidified and the ester product extracted with ether. After drying the latter over sodium sulfate and concentrating, there was obtained a residue which was recrystallized from ethyl acetate, to yield 260 mg. of (+)-7-chloro-4′-(p-hydroxy benzoyloxy)-4,6,2′-trimethoxy-6′-methyl-gris-2′-en-3-one; M.P. 166–167°; $[\alpha]_D = +143°$ (acetone; c.=0.07).

EXAMPLE 7

300 mg. of rac. 7-chloro-4,6,2′-trimethoxy-6′-methyl-gris-2′-en-3,4,′-dione (M.P. 250–252°) were dissolved in 100 ml. of methanol and reduced according to the directions in Example 1. After concentrating the reduction mixture in vacuo the residue was treated with water, filtered and recrystallized from ethyl acetate. There was obtained 220 mg. of rac. 7-chloro-4,6,2′-trimethoxy-6′-methyl-gris-2′-en-4′-ol-3-one of M.P. 244–246°. The melting point of a mixture containing the starting material and the reduction product showed a noticeable depression.

According to the same procedure as described above rac. 4,6,2′-trimethoxy-gris-2′-en-4′-ol-3-one of M.P. 163–164° was obtained by reduction of 4,6,2′-trimethoxy-gris-2′-en-3,4′-dione (M.P. 162–163°). Thin layer chromatographical analysis showed that the alcohol is present in the form of a mixture of two stereoisomeric racemates.

The starting material, rac. 7-chloro-4,6,2'-trimethoxy-6'-methyl-gris-2'-en-3,4'-dione, was prepared as follows:

2-carbomethoxy-7-chloro-4,6-dimethoxy - coumaran-3-one (M.P. 146–149°) was reacted with propenyl methyl ketone in absolute methanol and in the presence of benzyl trimethyl ammonium hydroxide. The stereoisomeric racemate (having a melting point of 185°) of the reaction product 2 - carbomethoxy-2-(1'-methyl-3'-oxo-n-butyl)-4,6-dimethoxy-7-chloro-coumaran-3-one was cyclized in methanol in the presence of sodium methylate. The product of cyclization of M.P. 233–235° was subsequently treated with diazomethane in methanol thereby yielding the starting material.

2-carbomethoxy - 7 - chloro-4,6-dimethoxy-coumaran-3-one in turn was prepared from 3-chloro-4,6-dimethoxy-salicyclic acid via its methyl ester (M.P. 185–186°) and by reacting the latter with bromoacetic acid methyl ester to yield 2-(carbomethoxymethoxy) - 3 - chloro-4,6-dimethoxy-benzoic acid methyl ester (M.P. 80–81°) and by subsequent ring closure.

The 4,6,2'-trimethoxy-gris-2'-en-3,4'-dione starting material was prepared in a similar way by adding methyl vinyl ketone to 2-carbomethoxy-4,6-dimethoxy-coumaran-3-one, cyclizing the addition product (M.P. 117–119°) and methylating the cyclization product (M.P. 204–206°).

EXAMPLE 8

2 g. (+)-4'-acetoxy - 7 - chloro-4,6,2'-trimethoxy-6'-methyl-gris-2'-en-3-one (obtained in Example 3) were dissolved in 200 ml. methanol and refluxed over 20 hours. After evaporating the solvent the residue was recrystallized from methanol. There was obtained (+)-7-chloro-4,6,2'-4'-tetramethoxy-6'-methyl-gris-2'-en-3-one of M.P. 201–203°; $[\alpha]_D = +189$ (acetone; c.=0.8).

The same product was obtained by treating (+)-7-chloro - 4,6,2' - trimethoxy - 6' - methyl-gris-2'-en-4'-ol-3-one (obtained in Example 1) with sodium iodide in methanol in the presence of sodium methylate.

EXAMPLE 9

12 g. of (+)-7-chloro-4,6,2'-trimethoxy-6'-methyl-gris-2'-en-4'-ol-3-one (obtained from Example 1) were dissolved in 240 ml. of pyridine. To this solution 16 ml. of undecenoyl chloride were slowly added at a temperature of 0°. After 2 hours of stirring at room temperature the mixture was poured into ice water and extracted with ethyl acetate. The extract was first washed with 1 N hydrochloric acid, then with sodium carbonate solution and finally with water, dried over sodium sulfate and evaporated. The oily residue solidified after standing. After washing with about 200 ml. of petroleum ether there were obtained 11 g. of (+)-7-chloro-4'-undecenoyloxy-4,6,2'-trimethoxy-6'-methyl-gris-2'-en-3-one of M.P. 84–85°; $[\alpha]_D = +81°$ (acetone; c.=1.15).

EXAMPLE 10

15 g. of (+)-7-chloro-4,6,2'-trimethoxy-6'-methyl-gris-2'-en-4'-ol-3-one (obtained from Example 1) and 30 g. of p-nitrobenzoyl chloride were reacted in 300 ml. of pyridine at a temperature of 0°. After working up as described in Example 9 there were obtained 14 g. of (+)-7-chloro - 4' - (p-nitro-benzoyloxy) - 4,6,2' - trimethoxy-6'-methyl-gris-2'-en-3'-one which after recrystallization from acetone/isopropyl ether has a M.P. of 160° and 200° (after previous resolidification); $[\alpha]_D = +78°$ (acetone; c.=1.13).

We claim:
1. 7-chloro-4,6,2'-trimethoxy - 6' - methyl-4'-pivaloyloxy-gris-2'-en-3-one.
2. 7 - chloro-4,6,2'-trimethoxy-6'-methyl-4'-undecenoyloxy-gris-2'-en-3-one.

References Cited
UNITED STATES PATENTS
3,392,175   7/1968   Lassman _____ 260—346.2

OTHER REFERENCES
Chem. Abstr., vol. 59, 61.1952, Abstracting British Specification 914, 502, January 1963.

Lassman v. Bross et al., 855 OG 12–16 (1968).

DONALD G. DAUS, Primary Examiner

U.S. Cl. X.R.
260—999, 546, 544